(12) United States Patent
Calderoni et al.

(10) Patent No.: US 12,418,240 B2
(45) Date of Patent: Sep. 16, 2025

(54) TIME MODULATION FOR DC-DC ANALOG CURRENT SENSING

(71) Applicant: STMicroelectronics International N.V., Geneva (CH)

(72) Inventors: Giuseppe Calderoni, Catania (IT); Marco Attanasio, Olbia-Tempio (IT)

(73) Assignee: STMicroelectronics International N.V., Geneva (CH)

( * ) Notice: Subject to any disclaimer, the term of this patent is extended or adjusted under 35 U.S.C. 154(b) by 209 days.

(21) Appl. No.: 18/240,459

(22) Filed: Aug. 31, 2023

(65) Prior Publication Data

US 2025/0079991 A1     Mar. 6, 2025

(51) Int. Cl.
    *H02M 3/158*     (2006.01)
    *G09G 3/3258*     (2016.01)
    *H02M 1/00*     (2006.01)

(52) U.S. Cl.
    CPC ........ *H02M 3/1582* (2013.01); *G09G 3/3258* (2013.01); *H02M 1/0009* (2021.05); *G09G 2310/0291* (2013.01); *G09G 2330/021* (2013.01)

(58) Field of Classification Search
    CPC .. H02M 3/1582; H02M 1/0009; H02M 1/007; G09G 3/3258
    See application file for complete search history.

(56) References Cited

U.S. PATENT DOCUMENTS

| | | | |
|---|---|---|---|
| 2004/0095112 A1 | 5/2004 | Kernahan et al. | |
| 2009/0180303 A1* | 7/2009 | Liu | H02M 1/08 363/21.14 |
| 2012/0153921 A1 | 6/2012 | Brokaw | |
| 2016/0181906 A1* | 6/2016 | Gambetta | H03F 3/45076 323/288 |

(Continued)

OTHER PUBLICATIONS

Yeh, Chia-An, et al.: "Digital Pulsewidth Modulation Technique for a Synchronous Buck DC/DC Converter to Reduce Switching Frequency," IEEE Transactions on Industrial Electronics, vol. 59, No. 1, Jan. 2012, 12 pgs.

(Continued)

*Primary Examiner* — Adolf D Berhane
*Assistant Examiner* — Afework S Demisse
(74) *Attorney, Agent, or Firm* — Crowe & Dunlevy LLC (57) ABSTRACT

A load is powered between positive and negative rails. A switching converter generates the negative rail voltage based on an input voltage, with a power transistor involved therein. A replica generator produces a replica voltage mirroring the drain-to-source voltage of the power transistor. A buffer buffers the replica voltage. A first switch selectively connects the buffered voltage to an output node, in response to a control signal with a duty-cycle proportional to the input voltage divided by the negative rail voltage. A second switch selectively connects the buffered voltage to ground, according to the inverse of the control signal, resulting in a PWM signal at the output node. An output filter filters the PWM signal to generate a sense voltage indicative of the output (Continued)

current flowing from the load device. A processing circuit determines the input current from the positive rail to the load device based on the sense voltage.

26 Claims, 6 Drawing Sheets

(56) References Cited

U.S. PATENT DOCUMENTS

2021/0201792 A1    7/2021   Lee et al.
2021/0234457 A1*   7/2021   Silva ........................ H02M 1/32

OTHER PUBLICATIONS

Hariharan, K., et al.: "Constant On/Off-Time Hybrid Modulation in Digital Current-Mode Control Using Event-Based Sampling," 2018, IEEE, 14 pgs.

Hong, Sund-Wan, et al.: Inverting Buck-Boost DC-DC Converter for Mobile AMOLED Display with Real-Time Self-Tuned Minimum Power-Loss Tracking Scheme, 2014, IEEE, 4 pgs.

* cited by examiner

TIME MODULATION FOR DC-DC ANALOG CURRENT SENSING

TECHNICAL FIELD

This disclosure pertains to continuous-time input and output current sensing in a DC-DC converter, such as in an inverting buck-boost converter utilized for producing a negative rail voltage in a display panel.

BACKGROUND

Power management is an aspect of concern in modern electronic systems, especially in portable devices such as smartphones, tablets, and laptops. These devices rely on efficient and precise voltage regulation to optimize power consumption and prolong battery life. One significant power-consuming component in such devices is its display panel. Display technologies, such as liquid crystal displays (LCDs) and organic light-emitting diodes (OLEDs), require accurate control of input and output currents to ensure optimal performance, brightness, and energy efficiency.

DC-DC converters, such as buck-boost converters, are often used in power management integrated circuits (PMICs) to regulate the voltage supplied to the display panel. In a typical PMIC, the converter generates and regulates positive and negative rail voltages based on an input voltage. The display panel consumes power by drawing input and output currents from these rails. Accurate determination and control of these currents is of interest for maintaining optimal display performance, energy efficiency, and prolonging battery life.

Traditional methods of monitoring and controlling the operation of DC-DC converters involve directly measuring the drain-to-source voltage (VDS) of the high-side transistor, which can be challenging and may introduce inaccuracies in the control loop. Furthermore, determining the display input current often involves complex circuitry, increasing complexity and reducing reliability. There is a need for an improved method and apparatus for determining input and output currents to the display panel and controlling the operation of DC-DC converters with enhanced accuracy and minimal complexity. In particular, measuring the output current through the negative rail is of interest. Given this, further development into this area is needed.

SUMMARY

Disclosed herein is an electronic device, including positive and negative rails at positive and negative rail voltages and configured to power a load device therebetween, a switching converter configured to generate the negative rail voltage based upon an input voltage, the switching converter including a power transistor involved in generation of the negative rail voltage, a replica voltage generation circuit configured to generate a replica voltage that is a replica of a drain to source voltage of the power transistor, and an amplifier circuit configured to amplify the replica voltage to produce an amplified voltage. The electronic device further includes a first switch configured to selectively couple the amplified voltage to an output filtration node, based upon a control signal having a duty cycle proportional to the input voltage divided by the negative rail voltage, and a second switch configured to selective couple the amplified voltage to ground, based upon an inverse of the control signal, thereby generating a pulse width modulated signal at the output filtration node. An output filter is configured to filter the pulse width modulated signal to generate a sense voltage representative of an output current flowing from the load device to the switching converter. A processing circuit is configured to determine an input current from the positive rail to the load device as a function of the sense voltage.

The replica voltage generation circuit may include a replica transistor that may be a replica of the power transistor, and a first resistor coupled between the input voltage and the replica transistor, wherein the replica transistor may be in a mirroring relationship with the power transistor to thereby generate a first voltage across the first resistor that may be proportional to a drain current of the power transistor. An output transistor may be coupled to a replica voltage node. A second resistor may be coupled between the input voltage and the output transistor. A regulation circuit may be configured to control the output transistor so as to maintain the first voltage and a second voltage across the second resistor as being equal, resulting in the replica voltage being generated at the replica voltage node.

The regulation circuit may include an amplifier having a non-inverting input terminal coupled to receive the first voltage, an inverting input terminal coupled to receive the second voltage, and an output coupled to a control terminal of the output transistor.

The output transistor may have a first conduction terminal coupled to receive the second voltage, a second conduction terminal coupled to the replica voltage node, and its control terminal coupled to the output of the amplifier.

The output transistor may be a p-channel transistor having a source coupled to receive the second voltage, a drain coupled to the replica voltage, and a gate coupled to the output of the amplifier.

The power transistor may be an n-channel transistor. The replica transistor may be an n-channel transistor having its drain connected to the first resistor, its source coupled to a converter output node, and a gate coupled to receive a same control signal as a gate of the power transistor.

A control signal generator may be configured to generate the control signal based upon the negative rail voltage.

The control signal generator may include a ramp signal generator configured to generate a ramp signal having a ramp rate related to the negative rail voltage, a comparator configured to compare the ramp signal to a reference voltage, and an output circuit configured to generate the control signal based upon output of the comparator.

The output circuit may include a first inverter configured to invert an output of the comparator to thereby produce the control signal, and a second inverter configured to invert the control signal to produce the inverse of the control signal.

The processing circuit may determine the input current as a function of the sense voltage by determining an output current from the load device to the negative rail as a function of the sense voltage, and determining the input current as a function of the output current and a resistance of the load device.

The load device may be a display panel.

The switching converter may be an inverting buck-boost converter.

The amplifier circuit may be configured as a buffer configured to buffer the replica voltage with a unity gain to produce the amplified voltage as a buffered voltage.

The amplifier circuit may include an amplifier having a non-inverting input coupled to receive a reference voltage, an inverting input coupled to a resistor, and an output, and an integration capacitor coupled between the non-inverting input of the amplifier and the output of the amplifier, wherein the resistor may be coupled between the inverting input of the amplifier and the replica voltage.

Also disclosed herein is an electronic device, including a first converter circuit configured to generate an input current for application to a load device, and a second converter circuit configured to sink an output current from the load device based upon an input voltage, wherein said second converter circuit includes a power transistor. A replica voltage generation circuit is configured to generate a replica voltage that is a replica of a drain to source voltage of the power transistor. A sample and filter circuit is configured to sample the replica voltage in response to a pulse width modulated sampling signal and filter the sampled replica voltage to produce an output voltage. A processing circuit is configured to determine the input current as a function of the output voltage.

The second converter circuit may sink the output current through a negative voltage rail, with the second converter circuit generating a negative voltage on the negative voltage rail.

A control circuit may be configured to generate the pulse width modulated sampling signal with a duty cycle proportional to the input voltage divided by the negative voltage.

The control circuit may include a ramp generator configured to generate a periodic ramp signal having a slope dependent on the negative voltage, and a comparator configured to compare the periodic ramp signal to a reference voltage, wherein the pulse width modulated sampling signal is derived from an output of the comparator.

Also disclosed herein is a method for determining input current from a positive rail to a load device. The method may include generating a negative rail voltage on a negative rail using a switching converter that includes a power transistor, generating a replica voltage of a drain to source voltage of the power transistor, generating a pulse width modulated signal based upon the replica voltage, in response to a control signal, filtering the pulse width modulated signal to produce a sense voltage representative of an output current from the load device to the negative rail, and determining the input current based upon the sense voltage.

The method may include generating the control signal based on the negative rail voltage using a control signal generator by generating a voltage proportional to the negative rail voltage, generating a reference voltage corresponding to an input voltage, comparing the proportional voltage and the reference voltage, thereby generating an error signal, and generating the control signal with a duty cycle proportional to the input voltage divided by the negative rail voltage, based on the error signal.

Further disclosed herein is a method for determining an input current from a positive rail to a load device in an electronic device. The method includes generating a negative rail voltage at a negative rail based upon an input voltage using a switching converter, the switching converter including a power transistor involved in the generation of the negative rail voltage, generating a replica voltage that is a replica of a drain to source voltage of the power transistor using a replica voltage generation circuit, amplifying the replica voltage to produce an amplified voltage, selectively coupling the amplified voltage to an output filtration node with a first switch based upon a control signal, and selectively coupling the amplified voltage to ground with a second switch based upon an inverse of the control signal, thereby generating a pulse width modulated signal at the output filtration node, filtering the pulse width modulated signal using an output filter to generate a sense voltage representative of an output current flowing from the negative rail to the load device, and determining the input current from the positive rail to the load device as a function of the sense voltage.

The control signal may have a duty cycle proportional to the input voltage divided by the negative rail voltage.

The method may include generating the control signal by generating a voltage proportional to the negative rail voltage, generating a reference voltage corresponding to the input voltage, comparing the voltage proportional to the negative rail voltage and the reference voltage and generating an error signal, and generating the control signal with a duty cycle proportional to the input voltage divided by the negative rail voltage based on the error signal using a pulse-width modulation (PWM) circuit.

The PWM circuit may generate the control signal by comparing a ramp signal generated by a ramp generator with the error signal, generating the control signal when the ramp signal is less than the error signal, and generating the inverse of the control signal when the ramp signal is greater than the error signal.

The amplification of the replica voltage may be performed as a buffering with a unity gain.

The amplification of the replica voltage may be performed by a non-inverting operation amplifier integrator.

DETAILED DESCRIPTION

The following disclosure enables a person skilled in the art to make and use the subject matter described herein. The general principles outlined in this disclosure can be applied to embodiments and applications other than those detailed above without departing from the spirit and scope of this disclosure. It is not intended to limit this disclosure to the embodiments shown, but to accord it the widest scope consistent with the principles and features disclosed or suggested herein.

Note that in the following description, any resistor or resistance mentioned is a discrete device, unless stated otherwise, and is not simply an electrical lead between two points. Therefore, any resistor or resistance connected between two points has a higher resistance than a lead between those two points, and such resistor or resistance cannot be interpreted as a lead. Similarly, any capacitor or capacitance mentioned is a discrete device, unless stated otherwise, and is not a parasitic element, unless stated otherwise. Additionally, any inductor or inductance mentioned is a discrete device, unless stated otherwise, and is not a parasitic element, unless stated otherwise.

Figure 1:
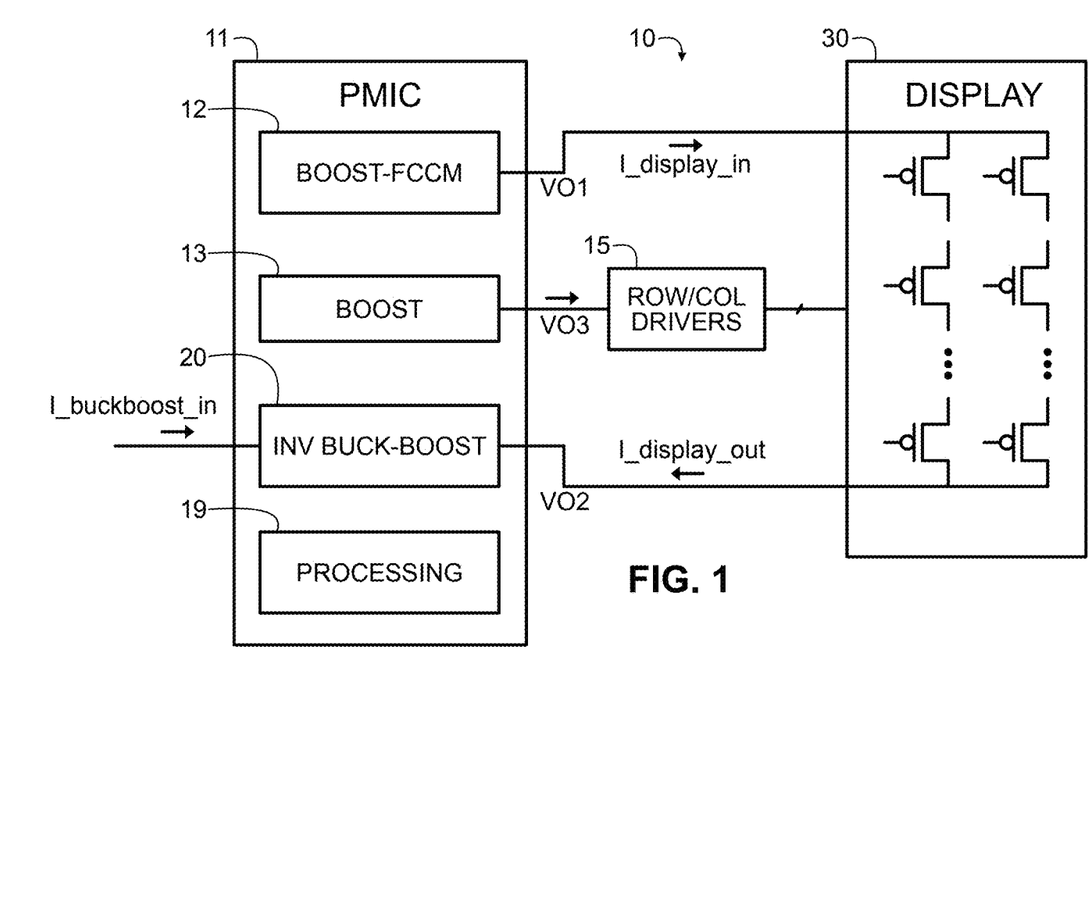
FIG. 1 is a block diagram of a display system described herein.

Referring first to FIG. 1, a display system 10 includes an Active Matrix Organic Light Emitting Diode (AMOLED) display panel 30 powered between a positive rail VO1 and a negative rail VOT2. A power management integrated circuit (PMIC) 11 features a boost-fixed frequency continuous mode (boost-FCCM) converter 12 designed to generate and regulate the positive rail voltage VO1. The PMIC 11 also includes an inverting buck-boost converter 20 employed to generate and regulate the negative rail voltage VO2.

The PMIC 11 further includes a boost converter 13 that generates a regulated pre-drive voltage VO3, which is utilized by row and column drivers 15. These drivers 15 are utilized for activating and deactivating display elements within the AMOLED display panel 30. The input current, denoted as I_display_in, flows out of the boost-FCCM converter 12, through the positive rail VO1, and into the display panel 30. The output current, denoted I_display_out, flows out of the display panel 30 through the negative rail VO2 and into the inverting buck-boost converter 20, which in this instance is configured to act as a current sink. As will be explained in greater detail below, the inverting buck-boost converter 20 receives an input current I_buckboost_in and, based thereupon, sinks the output current I_display_out from the display.

The objective is to estimate the display output current I_display_out by measuring the input current to the buck-boost converter I_buckboost_in, rather than measuring the display input current I_display_in from the boost-FCCM converter 12. From the display output current I_display_out, the display input current I_display_in can be calculated by considering the display as a resistance.

Using the relationship:

$$\frac{Iout}{Iin} = \frac{Vin}{Vout},$$

and keeping in mind that the display output current I_display_out is the output current of (e.g., the current sunk by) the inverting buck-boost converter 20, the display output current I_display_out can be calculated by a processing circuit 19 within the PMIC 11 as:

$$I\_display\_out = \frac{Vin}{VO2} \times I\_buckboost\_in.$$

From the display output current I_display_out, the display input current I_display_in can be calculated by the processing circuit 19.

Therefore, the determination of the input current to the buck boost converter I_buckboost_in is to be performed, as will be described below.

Figure 2:
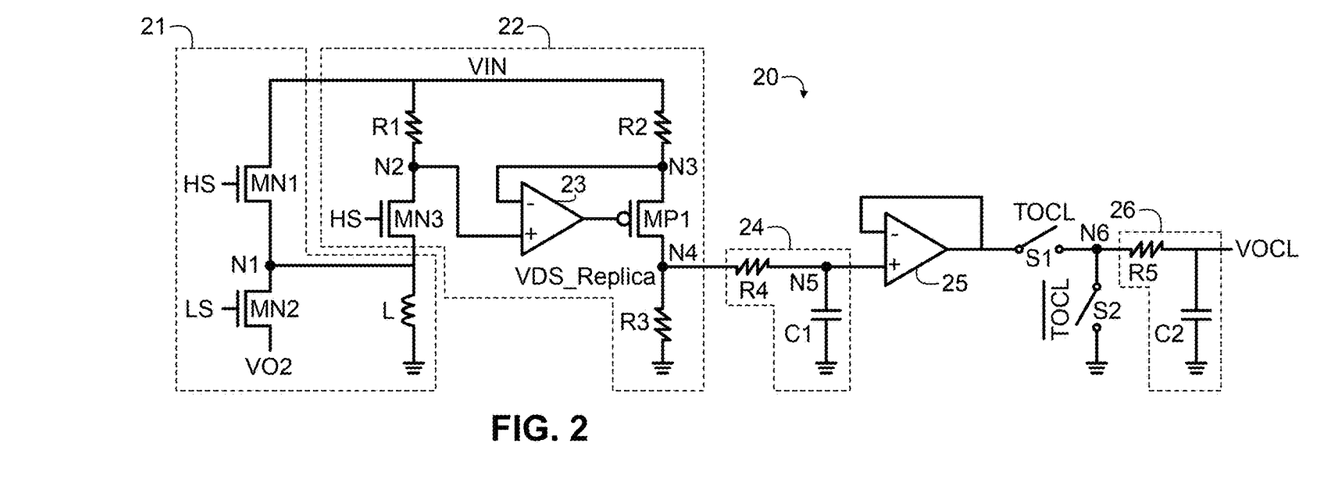
FIG. 2 is a schematic of the inverting buck-boost converter described herein.

The inverting buck-boost converter 20 is described in more detail with reference to FIG. 2. The converter 20 comprises an inverting buck-boost circuit 21, which is coupled between an input voltage VIN and the negative rail VO2. Additionally, a sensing circuit 22 is coupled to the output of the inverting buck-boost circuit 21. A filter 24 is implemented at the output of the sensing circuit 22, and the output of the filter 24 connects to the input of an amplifier 25, configured as a unity gain buffer. A first switch S1 selectively connects the output of the buffer 25 to an output filter 26 in response to a control signal TOCL which has a duty cycle proportional to Vin/VO2, while a second switch S2 selectively connects the junction between switch S1 and the output filter 26 to the ground in response to the inverse $\overline{TOCL}$ of the control signal TOCL.

Examining the inverting buck-boost circuit 21 in further detail, it includes a first n-channel transistor MN1 with its drain connected to the input voltage VIN, its source connected to node N1, and its gate receiving a high side control signal HS. The circuit 21 also features a second n-channel transistor MN2 with its drain connected to node N1, its source connected to the negative rail VO2, and its gate receiving a low side control signal LS. An inductor L is connected between node N1 and ground.

As to the sensing circuit 22, it comprises a resistor R1 connected between the input voltage VIN and node N2, as well as an n-channel transistor MN3 connected between nodes N2 and N1. Specifically, the drain of MN3 is connected to node N2, the source of MN3 is connected to node N1, and the gate of MN3 receives the high side control signal HS. A resistor R2 is connected between the input voltage VIN and node N3. A p-channel transistor MP1 has its source connected to node N3, its drain connected to node N4, and its gate connected to receive the output of an amplifier 23. A resistor R3 is connected between node N4 and ground. The amplifier 23 has its non-inverting input terminal connected to node N2, its inverting input terminal connected to node N3, and its output connected to the gate of the p-channel transistor MP1. The filter 24 is formed by a resistor R4 connected between node N4 and node N5, and a capacitor C1 connected between node N5 and ground.

The buffer 25 is formed by an amplifier having its non-inverting input terminal connected to node N5, its output connected to switch S1, and its inverting input terminal connected to its output.

The switch S1 is connected between the output of the amplifier 25 and node N6, and, as previously mentioned, is controlled by the control signal TOCL. The switch S2 is connected between node N6 and ground, and, as stated, is controlled by the inverse $\overline{TOCL}$ of the control signal TOCL.

Lastly, the output filter 26 is formed by a resistor R5 connected between node N6 and a first terminal of capacitor C2, while a second terminal of the capacitor C2 is connected to ground.

Alternative versions of the inverting buck-boost converter 20 exist. For example, in the version of the inverting buck-boost converter 20' shown in FIG. 2A, the filter 24 and amplifier 25 may be rearranged as a non-inverting operation amplifier integrator 24', with the inverting input terminal of the amplifier 25 being connected to node N5, capacitor C1 being connected between the inverting input terminal and the output of the amplifier 25, and non-inverting input terminal of the amplifier 25 being coupled to a reference voltage. In addition, here, resistor R3 is connected between node N4 and the reference voltage. Also, as an example, the sense voltage VOCL generated by the output filter 26 is here buffered by an amplifier 27 configured as a unity gain buffer, but it should be understood that this buffering arrangement may be added to any embodiment of the inverting buck-boost converter 20.

Operation is as follows. The inverting buck-boost converter 20, which is part of the PMIC 11, operates in two modes, buck and boost, to generate and regulate the negative rail voltage VO2 based on the input voltage VIN. In the buck mode, the input voltage VIN is stepped down, while in the boost mode, it is stepped up. This is achieved by controlling the switching of transistors MN1 and MN2 using the high side control signal HS and low side control signal LS, which in turn regulates the flow of current through the inductor L for energy storage and release, ultimately generating the negative rail voltage VO2.

The sensing circuit 22 creates a replica of the drain-to-source voltage (Vds) of the high-side transistor MN1, called VDS_Replica, through a combination of components and a feedback mechanism. Transistor MN3 is a replica of transistor MN1. Here, transistor MN3 acts as a switch. During high side conduction when transistors MN1 and MN3 are on, since the resistance of resistor R1 is much greater than the on-resistance of MN3, it may be assumed that node N2 is at the same voltage as node N1 when MN3 is on, but is otherwise at VIN due to the resistor R1 acting as a pull-up. The sensing circuit 22 uses amplifier 23 to maintain equal voltages at nodes N2 and N3. The feedback mechanism involving amplifier 23 and transistor MP1 adjusts the gate voltage of MP1, maintaining the voltage across resistor R2 at node N3 as being equal to the voltage across resistor R1 at node N2. Consequently, the voltage at node N4, VDS_Replica, is proportional to the drain-to-source voltage Vds of transistor MN1.

Observe that the combination of resistors R1, R2, and R3 creates a voltage division that scales the voltage at node N4 to match the actual VDS of MN1, allowing the sensing circuit to accurately replicate the drain-to-source voltage VDS of transistor MN1. Through the generation of VDS_Replica therefore, this design enables precise monitoring and control of the operation of the inverting buck-boost converter 20 without directly measuring the drain-to-source voltage of the high-side transistor MN1.

Continuing with the description of operation, VDS_Replica as generated at node N4 passes through the filter 24. This results in a voltage representative of the input current I_buckboost_in being generated at the non-inverting input terminal to the amplifier 25, and, after buffering, this voltage is sent to the output filter 26 through the switch circuits S1, S2.

Switch S1 operates synchronously with the control signal TOCL, which, as stated, has a duty cycle proportional to Vin/VO2. When TOCL is high, switch S1 closes, connecting the output of amplifier 25 to node N6. Conversely, when TOCL is low, switch S1 opens, disconnecting the buffer from node N6. Simultaneously, switch S2 operates synchronously with the inverse of the control signal TOCL, denoted as $\overline{TOCL}$. When $\overline{TOCL}$ is high, switch S2 closes, connecting node N6 to ground, and when $\overline{TOCL}$ is low, switch S2 opens, disconnecting node N6 from ground.

This synchronized operation of switches S1 and S2, combined with the duty cycle of TOCL, creates a pulse-width modulated (PWM) signal at node N6, with the pulse width being proportional to Vin/VO2. This PWM signal then passes through output filter 26, which filters out high-frequency components, generating the sense voltage VOCL.

Since the duty cycle of TOCL is proportional to Vin/VO2 and the voltage at the non-inverting input terminal of amplifier 25 represents the input current I_buckboost_in, the sense voltage VOCL produced at the output of output filter 26 is proportional to the absolute value of the display output current I_display_out. Therefore, at this point, the display output current I_display_out can be calculated by the processing circuit 19 as:

$$I_{display_{out}} = \frac{Vin}{VO2} \times I_{buckboost_{in}} = \text{I\_buckboost\_out}$$

This calculation will now be fully explained. At node N4, the instantaneous voltage across transistor MN1 is:

$$V_{N4} = \text{VDS\_Replica}(t) = RON_{MN1} \cdot I_L(t)$$

Here, $V_{N4}$ is the voltage at node N4, $RON_{MN1}$ is the on-resistance of transistor MN1, and $I_L(t)$ is the current through inductor L.

Figure 2A:
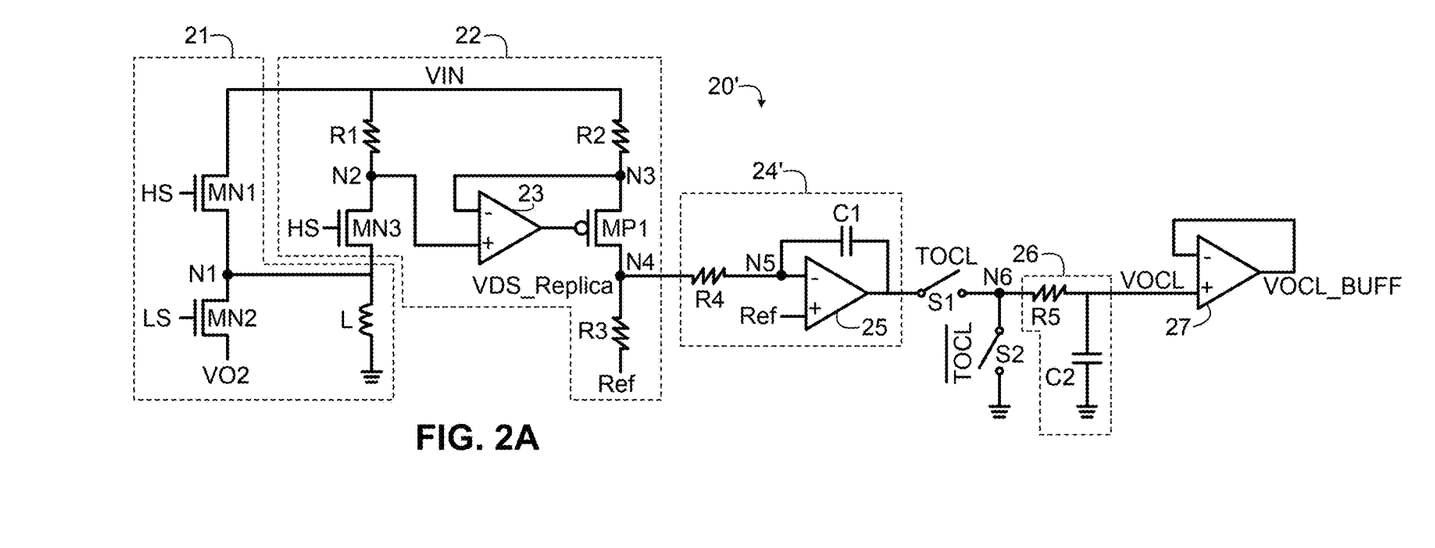
FIG. 2A is a schematic of an alternative embodiment of the inverting buck-boost converter described herein.

Filter 24' averages its input signal. In this way, at node N5, there is the average value of node N4, represented as:

$$V_{N5} = \overline{V_{N4}(t)}$$

Here, $V_{N5}$ is the voltage at node N5. Since $RON_{MN1}$ is almost constant, the equations can be rewritten as:

$$V_{N5} = \overline{V_{N4}(t)} = \overline{RON_{MN1} \cdot I_{MN1}(t)} = RON_{MN1} \cdot \overline{I_{MN1}(t)}$$

Therefore, the voltage $V_{N5}$ includes information about the average current in the transistor MN1, which is also the input current for the inverting buck-boost 20. Therefore:

$$V_{N5} = RON_{MN1} \cdot \overline{I_{MN1}(t)} = RON_{MN1} \cdot \text{I\_buckboost\_in}$$

Due to the action of switches S1 and S2, and filter 26, the following operation is effective performed:

$$V_{N5} \cdot Vin/VO2$$

It is possible to write:

$$VOCL = V_{N5} \cdot \frac{Vin}{VO2} = RON_{MN1} \cdot \text{I\_buckboost\_in} \cdot Vin/VO2$$

Recalling, however, that:

$$\text{I\_buckboost\_in} \cdot Vin = \text{I\_buckboost\_out} \cdot VO2$$

It can be said that:

$$VOCL = RON_{MN1} \cdot I_{buckboost_{in}} \cdot \frac{Vin}{VO2} = RON_{MN1} \cdot \text{I\_buckboost\_out}$$

Therefore, it is possible to state that:

$$VOCL = RON_{MN1} \cdot \text{I\_buckboost\_out} = RON_{MN1} \cdot \text{I\_display\_out}$$

Therefore, $$I_{display_{out}} = \text{I\_buckboost\_out}$$

Continuing with the description of operation, tn order to determine the display input current I_display_in from the display output current I_display_out, the resistance of the current path through the display 30 is taken into account. The display panel 30 can be thought of as a resistive element through which the input current I_display_in flows, causing a voltage drop across it. This voltage drop is equal to the difference between the positive rail voltage VO1 and the negative rail voltage VO2.

According to Ohm's Law, the voltage across a resistive element is equal to the product of the current flowing through it and its resistance (V=I×R). In this case, the voltage across the display panel 30 can be expressed as the product of the display input current I_display_in and the resistance R_display of the current path through the display, which can be represented as:

$$VO1 - VO2 = \text{I\_display\_in} \times \text{R\_display}$$

Given that the display output current I_display_out is now known, as is the relationship between the display input and output currents, the above equation can be rearranged to find the display input current I_display_in:

$$I_{display\_in} = \frac{VO1 - VO2}{\text{R\_display}} = \text{I\_buckboost\_out}$$

By knowing the resistance R_display of the current path through the display, the display input current I_display_in can be calculated by the processing circuit 19 using the voltage difference between the positive rail VO1 and the negative rail VO2. This approach allows for the determination of the display input current I_display_in and therefore I_buckboost_out based on the previously calculated display output current I_display_out and the known resistance of the display panel 30.

Figure 3:
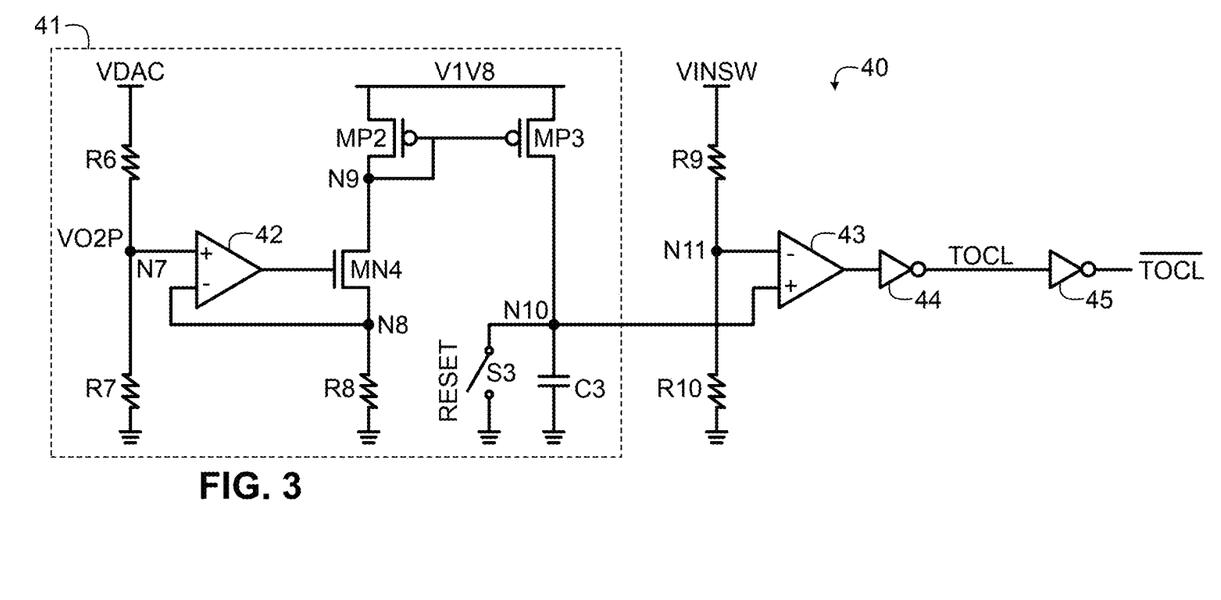
FIG. 3 is a schematic of a control signal generator that generates the control signals for the switches of the inverting buck-boost converter of FIG. 2.

The control signal TOCL and its inverse $\overline{\text{TOCL}}$ are generated by a control signal generator 40, described in further detail with reference to FIG. 3. The control signal generator 40 includes a ramp generator 41 and a comparator circuit 43.

The ramp generator 41 includes a resistor R6 connected between voltage VDAC and node N7, and a resistor R7 connected between node N7 and ground. An amplifier 42 has its non-inverting input terminal connected to node N7, its inverting input terminal connected to node N8, and its output connected to the gate of n-channel transistor MN4. The drain of MN4 is connected to node N9, while its source is connected to node N8. A resistor R8 is connected between node N8 and ground. A current mirror is connected between nodes N9 and N10, and is formed by p-channel transistor MP2, which has its source connected to voltage V1V8, its drain connected to node N9, and its gate connected to node N9. The current mirror also includes a p-channel transistor MP3 with its source connected to voltage V1V8, its drain connected to node N10, and its gate connected to node N9. A switch S3 selectively connects node N10 to ground and is controlled by a reset signal RESET. A capacitor C3 is connected between node N10 and ground.

The comparator circuit 43 comprises an amplifier 43 configured as a comparator, with its non-inverting input terminal connected to node N10, its inverting input terminal connected to node N11, and its output connected to the input of inverter 44. A resistor R9 is connected between a voltage VINSW and node N11. An inverter 45 has its input connected to the output of inverter 44.

In operation, the ramp generator 41 creates a ramp signal at node N10 by charging and discharging capacitor C3 through a current mirror formed by transistors MP2 and MP3. In greater detail, the operation of amplifier 42 and transistor MN4 converts voltage VO2P (which is proportional to the negative rail voltage VO2) to a current flowing in the left-side of the current mirror. When switch S3 is opened by deassertion of the reset signal, the mirrored current flowing in the right-side of the current mirror charges capacitor C3, with the rate of charge and the slope of the ramp being set by the value of the mirrored current and the capacitance of the capacitor C3.

The amplifier 43, configured as a comparator, compares the ramp signal at node N10 with the reference voltage at node N11 and outputs a high or low signal depending on whether the ramp signal is above or below the voltage at node N11. This output signal is then sent to the input of inverter 44, which inverts the signal to generate the control signal TOCL. Finally, the control signal TOCL is inverted once more by inverter 45 to produce the inverse $\overline{\text{TOCL}}$ of the control signal TOCL.

Figure 4:
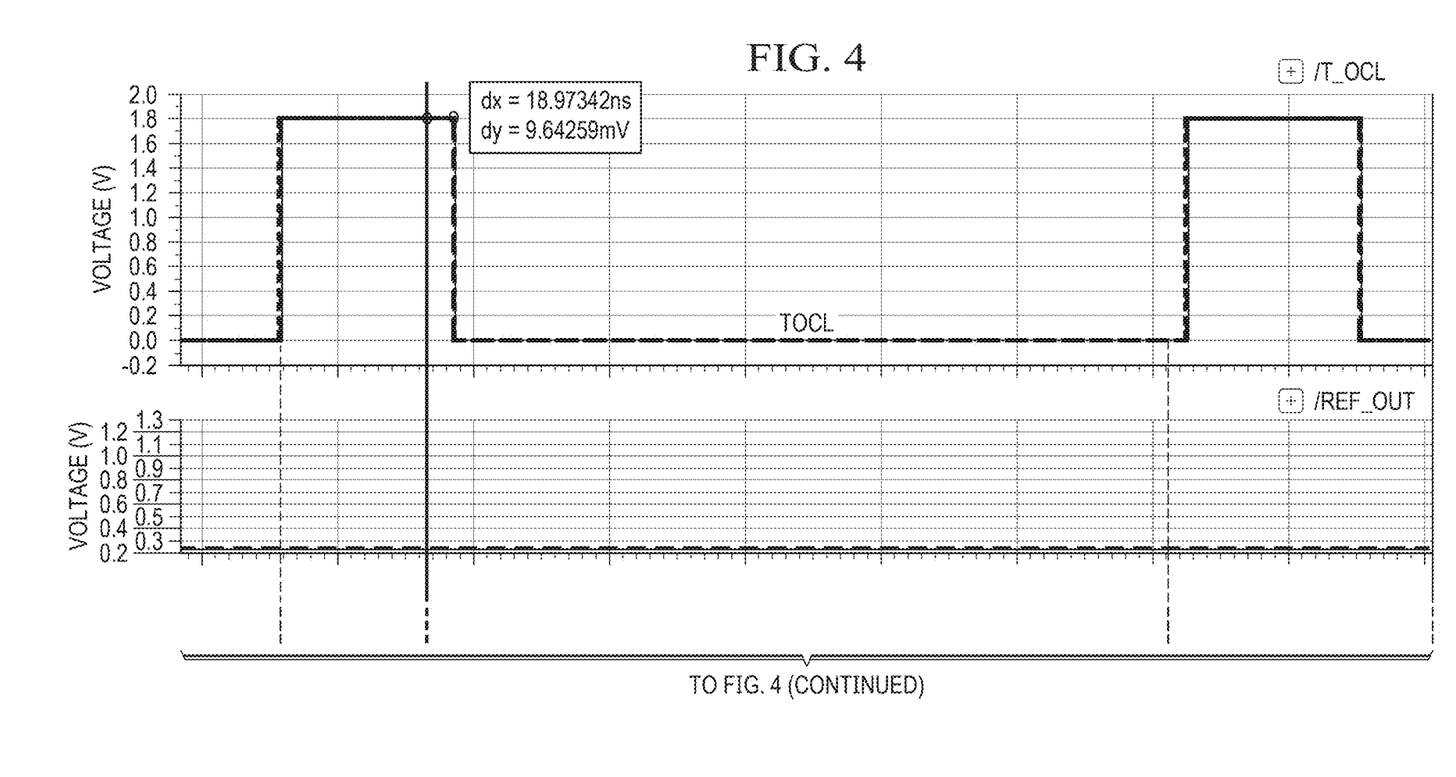
FIG. 4 is a graph showing generation of the control signals of FIG. 3 during operation.

The generation of TOCL and the ramp signal at node N10 (denoted RAMP) can be seen in FIG. 4. Just prior to time T1, the reset signal RESET has been asserted, closing switch S3, causing discharge of the charge on capacitor C3 to ground. Therefore at time T1, RAMP is at ground. This means that RAMP is less than the reference voltage at node N11, resulting in deassertion of the output of the amplifier 43, and therefore assertion of the control signal TOCL.

The reset signal RESET is then deasserted and RAMP begins to ramp upwardly as described above. Observe that the ramping rate of RAMP changes depending upon the value of the input voltage VIN because the mirrored current magnitude of dependent on the voltage VO2P. At time T2, RAMP has exceeded the reference voltage at node N11, with the result being that the output of the amplifier 43 is asserted and therefore the control signal TOCL is deasserted, as shown at time T2.

The sensing circuit described above can be utilized with other types of converters apart from an inverting buck-boost converter. For instance, non-inverting buck-boost converters, Ćuk converters, or other DC-DC converters that involve precise control and regulation of output voltages could benefit from the inventive approach. A notable aspect described above is the ability to determine the display output current by measuring the input current to the converter and calculating the display input current accordingly. This principle can be applied to any converter that serves as a current sink and is used in conjunction with a display panel, or any other load that can be considered as a resistive element.

The overall advantages are numerous. Firstly, the sensing circuit described herein allows for precise control and monitoring of the converter's operation without directly measuring high-side transistor drain-to-source voltage, which can be challenging and may introduce inaccuracies in the control loop. By generating a replica of this voltage and utilizing the control signal (TOCL) as generated, the accurate control and regulation of the converter's output voltage is achieved.

Secondly, the sensing circuit simplifies the process of determining the display input current by permitting calculation of it from the display output current and known resistance of the display panel. This approach eliminates the need for direct measurement of the display input current, reducing complexity and increasing reliability. By enabling precise control and regulation of output voltages, the efficiency and performance of display systems can be improved, leading to better energy management, longer battery life, and enhanced user experiences.

Lastly, this approach is versatile and can be applied to various types of converters and power management systems. For example, the approach may be applied to a buck converter, a non-inverting buck-boost controller, or a boost controller.

Figure 5:
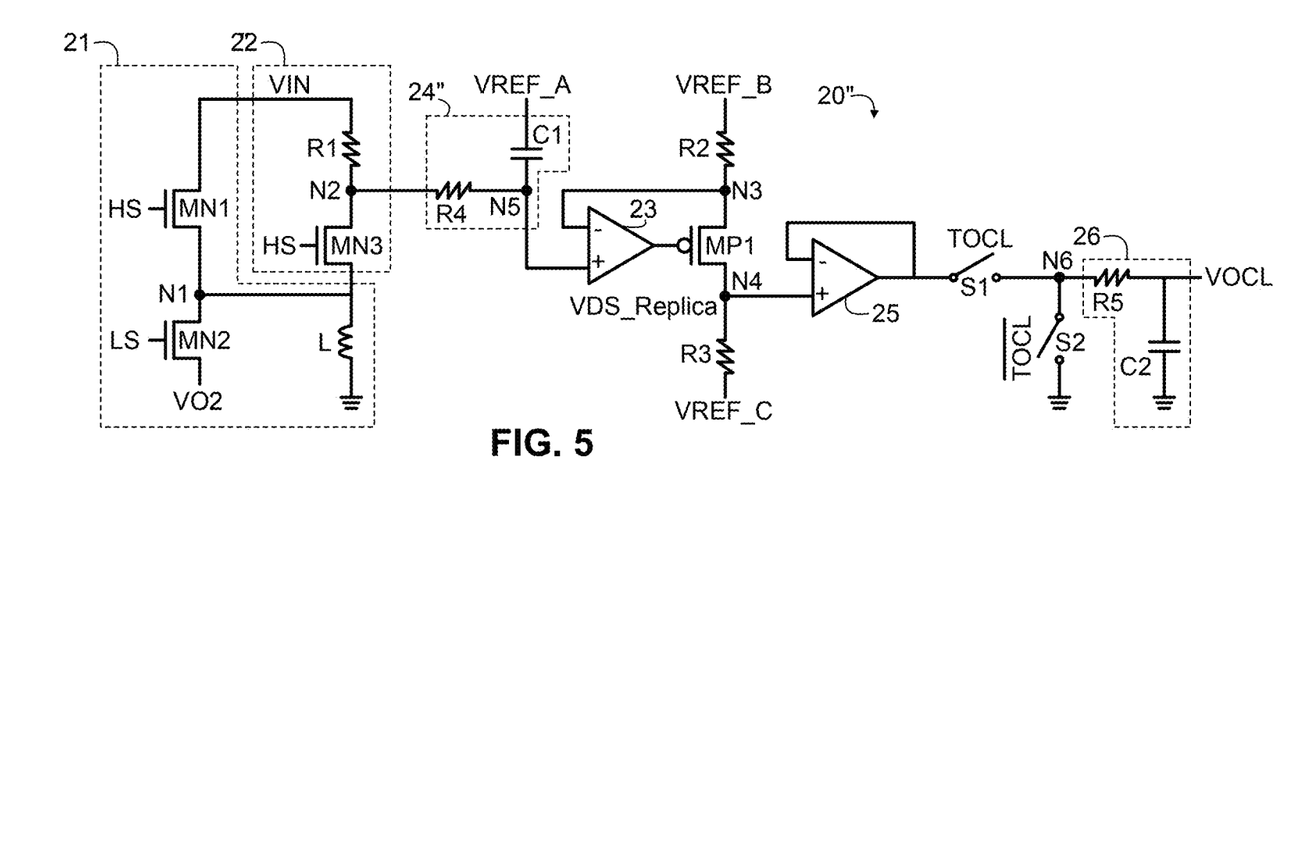
FIG. 5 is a schematic of another alternative embodiment of the inverting buck-boost converter described herein.

Finally, it is evident that modifications and variations can be made to what has been described and illustrated herein without departing from the scope of this disclosure. For example, refer now to the embodiment of the inverting buck-boost converter 20" shown in FIG. 5. Here, the filter 24" formed by resistor R1 and C1 has been placed before the amplifier 23, with resistor R4 being connected between nodes N2 and N5, capacitor C1 being connected between node N5 and a reference voltage VREF_A, and the non-inverting input terminal of amplifier 23 being connected to node N5. In addition, the resistor R2 is connected between node N3 and a reference voltage VREF_B to provide offset and the resistor R3 is connected between node N4 and a reference voltage VREF_C. The reference voltages VREF_A and VREF_B may be equal. Operation of this inverting buck-boost converter 20" is otherwise as described above.

Although this disclosure has been described with a limited number of embodiments, those skilled in the art, having the benefit of this disclosure, can envision other embodiments that do not deviate from the disclosed scope. Furthermore, skilled persons can envision embodiments that represent various combinations of the embodiments disclosed herein made in various ways.

The invention claimed is:

1. An electronic device, comprising:
   positive and negative rails at positive and negative rail voltages and configured to power a load device therebetween;
   a switching converter configured to generate the negative rail voltage based upon an input voltage, the switching converter including a power transistor involved in generation of the negative rail voltage;
   a replica voltage generation circuit configured to generate a replica voltage that is a replica of a drain to source voltage of the power transistor;
   an amplifier circuit configured to amplify the replica voltage to produce an amplified voltage;
   a first switch configured to selectively couple the amplified voltage to an output filtration node, based upon a control signal having a duty cycle proportional to the input voltage divided by the negative rail voltage, and a second switch configured to selective couple the amplified voltage to ground, based upon an inverse of the control signal, thereby generating a pulse width modulated signal at the output filtration node;
   an output filter configured to filter the pulse width modulated signal to generate a sense voltage representative of an output current flowing from the load device to the switching converter; and
   a processing circuit configured to determine an input current from the positive rail to the load device as a function of the sense voltage.

2. The electronic device of claim 1, wherein the replica voltage generation circuit comprises:
   a replica transistor that is a replica of the power transistor;
   a first resistor coupled between the input voltage and the replica transistor;
   wherein the replica transistor is in a mirroring relationship with the power transistor to thereby generate a first voltage across the first resistor that is proportional to a drain current of the power transistor;
   an output transistor coupled to a replica voltage node;
   a second resistor coupled between the input voltage and the output transistor; and
   a regulation circuit configured to control the output transistor so as to maintain the first voltage and a second voltage across the second resistor as being equal, resulting in the replica voltage being generated at the replica voltage node.

3. The electronic device of claim 2, wherein the regulation circuit comprises an amplifier having a non-inverting input terminal coupled to receive the first voltage, an inverting input terminal coupled to receive the second voltage, and an output coupled to a control terminal of the output transistor.

4. The electronic device of claim 3, wherein the output transistor has a first conduction terminal coupled to receive the second voltage, a second conduction terminal coupled to the replica voltage node, and its control terminal coupled to the output of the amplifier.

5. The electronic device of claim 4, wherein the output transistor is a p-channel transistor having a source coupled to receive the second voltage, a drain coupled to the replica voltage, and a gate coupled to the output of the amplifier.

6. The electronic device of claim 2, wherein the power transistor is an n-channel transistor; wherein the replica transistor is an n-channel transistor having its drain connected to the first resistor, its source coupled to a converter output node, and a gate coupled to receive a same control signal as a gate of the power transistor.

7. The electronic device of claim 1, further comprising a control signal generator configured to generate the control signal based upon the negative rail voltage.

8. The electronic device of claim 7, wherein the control signal generator comprises:
   a ramp signal generator configured to generate a ramp signal having a ramp rate related to the negative rail voltage;
   a comparator configured to compare the ramp signal to a reference voltage; and
   an output circuit configured to generate the control signal based upon output of the comparator.

9. The electronic device of claim 8, wherein the output circuit comprises:
   a first inverter configured to invert an output of the comparator to thereby produce the control signal; and
   a second inverter configured to invert the control signal to produce the inverse of the control signal.

10. The electronic device of claim 1, wherein the processing circuit determines the input current as a function of the sense voltage by:
    determining an output current from the load device to the negative rail as a function of the sense voltage; and
    determining the input current as a function of the output current and a resistance of the load device.

11. The electronic device of claim 1, wherein the load device is a display panel.

12. The electronic device of claim 1, wherein the switching converter comprises an inverse buck-boost converter.

13. The electronic device of claim 1, wherein the amplifier circuit is configured as a buffer configured to buffer the replica voltage with a unity gain to produce the amplified voltage as a buffered voltage.

14. The electronic device of claim 1, wherein the amplifier circuit comprises:
an amplifier having a non-inverting input coupled to receive a reference voltage, an inverting input coupled to a resistor, and an output; and
an integration capacitor coupled between the non-inverting input of the amplifier and the output of the amplifier;
wherein the resistor is coupled between the inverting input of the amplifier and the replica voltage.

15. An electronic device, comprising:
a first converter circuit configured to generate an input current for application to a load device;
a second converter circuit configured to sink an output current from the load device based upon an input voltage;
wherein said second converter circuit includes a power transistor;
a replica voltage generation circuit configured to generate a replica voltage that is a replica of a drain to source voltage of the power transistor;
a sample and filter circuit configured to sample the replica voltage in response to a pulse width modulated sampling signal and filter the sampled replica voltage to produce an output voltage; and
a processing circuit configured to determine the input current as a function of the output voltage.

16. The device of claim 15, wherein the second converter circuit sinks the output current through a negative voltage rail, with the second converter circuit generating a negative voltage on the negative voltage rail.

17. The device of claim 16, further including a control circuit configured to generate the pulse width modulated sampling signal with a duty cycle proportional to the input voltage divided by the negative voltage.

18. The device of claim 17, wherein the control circuit comprises:
a ramp generator configured to generate a periodic ramp signal having a slope dependent on the negative voltage; and
a comparator configured to compare the periodic ramp signal to a reference voltage, wherein the pulse width modulated sampling signal is derived from an output of the comparator.

19. A method for determining input current from a positive rail to a load device, the method comprising:
generating a negative rail voltage on a negative rail using a switching converter that includes a power transistor;
generating a replica voltage of a drain to source voltage of the power transistor;
generating a pulse width modulated signal based upon the replica voltage, in response to a control signal;
filtering the pulse width modulated signal to produce a sense voltage representative of an output current from the load device to the negative rail; and
determining the input current based upon the sense voltage.

20. The method of claim 19, further comprising generating the control signal based on the negative rail voltage using a control signal generator by:
generating a voltage proportional to the negative rail voltage;
generating a reference voltage corresponding to an input voltage;
comparing the proportional voltage and the reference voltage, thereby generating an error signal; and
generating the control signal with a duty cycle proportional to the input voltage divided by the negative rail voltage, based on the error signal.

21. A method for determining an input current from a positive rail to a load device in an electronic device, the method comprising:
generating a negative rail voltage at a negative rail based upon an input voltage using a switching converter, the switching converter including a power transistor involved in the generation of the negative rail voltage;
generating a replica voltage that is a replica of a drain to source voltage of the power transistor using a replica voltage generation circuit;
amplifying the replica voltage to produce an amplified voltage;
selectively coupling the amplified voltage to an output filtration node with a first switch based upon a control signal, and selectively coupling the amplified voltage to ground with a second switch based upon an inverse of the control signal, thereby generating a pulse width modulated signal at the output filtration node;
filtering the pulse width modulated signal using an output filter to generate a sense voltage representative of an output current flowing from the negative rail to the load device; and
determining the input current from the positive rail to the load device as a function of the sense voltage.

22. The method of claim 21, wherein the control signal has a duty cycle proportional to the input voltage divided by the negative rail voltage.

23. The method of claim 21, further comprising generating the control signal by:
generating a voltage proportional to the negative rail voltage;
generating a reference voltage corresponding to the input voltage;
comparing the voltage proportional to the negative rail voltage and the reference voltage and generating an error signal; and
generating the control signal with a duty cycle proportional to the input voltage divided by the negative rail voltage based on the error signal using a pulse-width modulation (PWM) circuit.

24. The method of claim 23, wherein the PWM circuit generates the control signal by comparing a ramp signal generated by a ramp generator with the error signal, generating the control signal when the ramp signal is less than the error signal, and generating the inverse of the control signal when the ramp signal is greater than the error signal.

25. The method of claim 21, wherein the amplification of the replica voltage is performed as a buffering with a unity gain.

26. The method of claim 21, wherein the amplification of the replica voltage is performed by a non-inverting operation amplifier integrator.

* * * * *